Dec. 17, 1963 F. DE SANTIS ETAL 3,114,886
PULSE REGULATING SYSTEM
Filed Nov. 1, 1960
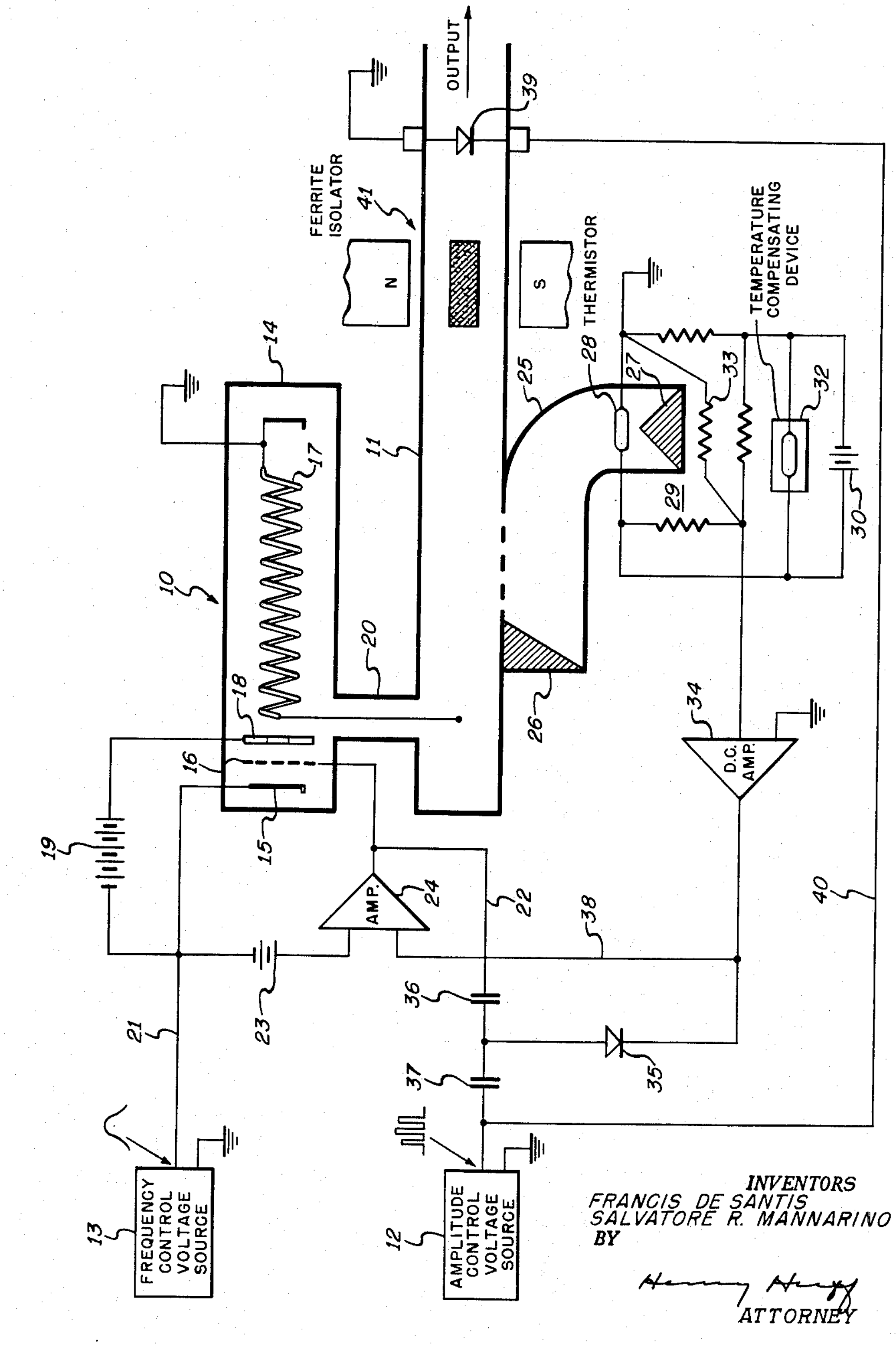
INVENTORS
FRANCIS DE SANTIS
SALVATORE R. MANNARINO
BY
ATTORNEY 3,114,886
PULSE REGULATING SYSTEM Francis De Santis, New Milford, N.J., and Salvatore R. Mannarino, Flushing, N.Y., assignors to Sperry Rand Corporation, Great Neck, N.Y., a corporation of Delaware Filed Nov. 1, 1960, Ser. No. 66,594
9 Claims. (Cl. 332—13)

This invention relates to regulating devices and more particularly it concerns a system for ensuring accurate control of the output characteristics of a multiple input pulse type transducer.

The various output characteristics of many energy transducers are individually controlled by adjustment of specific input quantities. It often happens in such transducers that adjustment of one input for the purpose of controlling a particular output characteristic will result in an undesired effect being produced on another output characteristic. In microwave oscillators of the traveling wave type, for example, where the output frequency and amplitude are controlled respectively by the cathode and grid input voltages, the gain of the device is also affected by the cathode voltage. Thus the output amplitude is not solely a function of the grid voltage, but is also dependent upon the cathode voltage. Such a situation is undesirable where the output must be accurately controlled in both frequency and amplitude on a pulse to pulse basis.

Past attempts to overcome this problem have included the provision of a frequency sensitive attenuator at the output of the device. However, because of the erratic gain versus frequency variations in these oscillators such an attenuator is extremely difficult to construct. Furthermore, its use results in a great waste of power. Other corrective means have included feedback arrangements which would degeneratively control the grid voltage in response to the output amplitude of the oscillator. This arrangement becomes inadequate however, where the oscillator is used to produce very narrow pulses. Inherent lags in the feedback system prevent instantaneous correction of the pulse amplitude.

Consequently, it is an object of this invention to provide a means for accurately controlling erratic output characteristics of a pulse type transducer system.

It is another object to provide a means for eliminating the undesired side effects of certain input quantities on the various output characteristics of a transducer.

Another object is to provide such a means which will accurately control the characteristics of very narrow pulse outputs of a transducer.

A further object is to provide such a means wherein a minimum of power loss will be experienced.

A still further object is to provide a microwave oscillator system having a constant gain characteristic over a wide frequency range.

These and other objects will become more apparent as the preferred embodiment of the invention is described.

Briefly, the invention accomplishes its purposes in the following manner. Input quantities which undesirably affect certain output characteristics are varied in magnitude in a gradual manner while input quantities which desirably affect these characteristics are varied intermittently in accordance with the duration of and interval between the output pulses. A relatively small but continuous bias is applied to the intermittently controlled inputs so as to maintain a low valued continuous output between the pulses. Means are provided for detecting the changes in magnitude of the output characteristics which occur gradually rather than intermittently and these changes are used, in degenerative fashion, to control the magnitude of the intermittently controlled inputs. Thus, the comparatively slowly changing input quantities which cause undesired side effects may be compensated continuously without the necessity of feeding back a very short intermittent pulse of energy.

It is to be noted that the term "input quantities" may include uncontrolled and inadverently applied quantities as well as controlled inputs. Thus, the undesired effects produced upon certain output characteristics by such gradually varying conditions as aging, ambient temperature and conditions during warm-up may also be corrected in the manner of the present invention.

Referring now to the drawing, the single FIGURE is a schematic drawing representing a system which embodies the principles of the present invention.

In the system shown, a microwave transducer 10 produces pulses of microwave energy at an output waveguide 11. The amplitude and frequency characteristics of the pulses are controlled by amplitude and frequency control sources designated as 12 and 13, respectively. A bias system and a novel feedback system cooperate to ensure accuracy of control of these output characteristics.

The microwave transducer 10 is generally known as a backward wave oscillator. Such a device consists essentially of an evacuated envelope 14, which encloses a cathode 15, a grid 16, a slow wave structure such as a helix 17, and an anode 18. An external battery 19 or similar voltage source is connected between the cathode and anode which produce an electron beam within the device. The helix 17 is aligned coaxially with the beam. One end of the helix is maintained at ground potential while the other end forms a part of an output coupling 20 to the output waveguide 11. The amplitude of the output waves from the oscillator depends upon the electron beam current which is controlled by the voltage of the grid 16 with respect to the cathode 15. The frequency of the output waves, depends upon the electron beam velocity which, in turn, is controlled by the value of the cathode voltage with respect to ground.

The frequency control voltage source 13 establishes cathode potentials via a cathode input line 21. It is to be noted that this line is also connected to the anode 18 and to the grid 16. Thus, variation of the cathode potential in the manner shown affects beam velocity, and thus the frequency of the output waves from device 10 through control of the voltage level of the beam generating portion of the device with respect to the voltage of helix 11. The change in cathode potential also undesirably affects the amplitude of the output waves of the device, and this undesirable change is a continuous and gradual change since this is the nature of the cathode voltage change, as herein described. It is to be noted that all other factors which undesirably affect amplitude such as ambient conditions, regulation of input power and warm-up conditions also vary in a gradual manner.

The amplitude control voltage source 12 supplies voltage pulses via a grid input line 22 to the grid 16. The pulse outputs from the source 12 have an amplitude proportional to the desired output amplitude and have durations and intervals coinciding in time with the desired output pulse duration and interval.

It is to be noted at this point that the change in cathode voltage produces a continuous and gradual undesirable change in the amplitude of the output waves from device 10, while the voltage pulses applied to grid 16 from amplitude control voltage source 12 produce a desired abrupt or intermittent change in the amplitude of the output waves.

The bias system comprises a bias voltage source 23 and a bias amplifier 24 connected between the cathode and grid input lines 21 and 22. This arrangement maintains a continuous grid to cathode voltage bias for the production of a low amplitude microwave output during the intervals between pulses. The output of the bias amplifier 24 is seen to be referenced to the feedback system by means of a lead 38. This provides feedback control of the bias amplifier 24 for reasons to be explained. If desired, a constant bias may be maintained by referencing the bias amplifier to ground instead of to the feedback system.

The feedback system comprises an output sampling portion, a selective detecting portion and a control portion. The output sampling portion is shown as a directional coupler 25 connected to the output waveguide 11. Matched impedance terminations 26 and 27 are provided at either end of the coupler to reduce standing waves. The selective detection portion of the feedback system includes a means for detecting those variations in amplitude of the output waves which occur from effects other than grid modulation. The two operations of selection and detection are conveniently performed in the present system by the provision of an integrating type detection element such as thermistor 28, located within the coupler. The thermistor forms one arm of a balanced resistance bridge circuit 29. A voltage source 30 and a temperature compensation device 32 are connected in parallel across the bridge and provide the required thermistor bias current. The temperature compensation device 32 may be a further thermistor. As its resistance changes with ambient temperature, more or less bias current will flow through the bridge thermistor 28. In this manner the effects of changes in resistance of the bridge resistor caused by ambient temperature variations are cancelled. The thermistor output is detected as a voltage developed across a bridge resistor 33. This voltage is amplified as needed in a D.C. amplifier 34. The control portion of the feedback system comprises a clipping diode 35 connected to the grid input line 22 and back-biased by the output of the feedback amplifier 34. Pulses from the amplitude control voltage source 12 are thus reduced in amplitude by an amount depending upon the bias supplied from the feedback system.

Two capacitors, 36 and 37, are provided in the grid input line 22 on either side of the connection to the clipping diode 35. The purpose of the capacitors is to prevent direct or slowly varying current leakage into the relatively low impedance diode 35 from the grid bias system. The capacitors are large enough to permit pulses from the control source 12 to pass to the oscillator grid 16.

The system operates in the following manner. Voltages having magnitudes proportional to the desired output amplitude and frequency are supplied by the respective control sources 12 and 13. The voltages from the frequency control source 13 are supplied and varied gradually while the voltages from the amplitude control source 12 are supplied intermittently in accordance with the desired output pulse width and amplitude. During the intervals between these input pulses a continuous low amplitude microwave output is maintained through a bias supplied by the bias voltage source 23. As the frequency control voltage from source 13 is varied in magnitude, the gain characteristics of the oscillator tend to change accordingly. Because of the gradual and continuous manner in which the frequency control voltage and certain other inputs are varied, the changes in the amplitude of the output waves produced by them occur in a generally continuous manner while the changes in the amplitude of the output waves caused by the pulsed inputs occur intermittently.

A predetermined portion of the oscillator output is applied to the thermistor element 28 in the directional coupler. Thermistor operation involves the conversion of incident microwave energy to heat which controls the temperature and electrical resistance of the thermistor accordingly. Because a thermistor has a finite heat capacity the amount by which is changes temperature and resistance depends upon both the amplitude of the incident microwave energy and its duration. Thus, the thermistor is more sensitive to the gradual changes in the relatively low amplitude continuous outputs of the oscillator than it is to the extremely short duration intermittent changes of the pulsed outputs. In this manner he undesired effecs of certain inputs are isolated and made available for detection. The resulting changes in electrical resistance of the thermistor produce a bridge unbalance which results in a proportional voltage differential across the bridge resistor 33. This voltage differential is amplified in the D.C. amplifier 34 which raises it to a proper value for use in the control portion of the feedback network.

Besides providing a convenient means for combining the selection and detection functions of the feedback network, the thermistor provides certain other advantages not possessed by more conventional microwave detectors such as crystal diodes. The thermistor sensitivity varies much less over a wide frequency range than does that of a crystal. Thermistor characteristics are repeatable from day to day and from element to element while crystal characteristics are not. Finally, the extreme sensitivity of crystals requires a great deal of prior attenuation of incident microwave energy. A thermistor, which is a far more rugged element is not so affected, thus making laboratory type accuracy available in field equipment.

The feedback control voltage from the D.C. amplifier 34 is used to back bias the clipping diode 35. The next subsequent pulse from the amplitude control source 12 is clipped by an amount depending upon the magnitude of the bias supplied from the feedback network. Thus, a pulse from the amplitude control voltage source will produce a proportional output pulse irrespective of gain variations caused by variations in cathode potential or any other non-intermittently varying conditions.

In certain instances as where pulse intervals are very long or where the gain characteristics of the microwave oscillator change erratically undesired output waves may occur between pulses. To alleviate this difficulty a lead 38 may be provided between the feedback network and a control element in the amplifier 24 to provide bias control between pulses. Obviously, when such control is employed, the clipping level at the diode 35 must also be increased since the feedback to the amplifier 24 will produce some of the compensation provided by the feedback network. This may be accomplished by proper adjustment of the gain of the D.C. feedback amplifier 34. If desired, the continuous grid bias control method may be employed to the exclusion of the input pulse clipping system previously described.

For certain situations it may become desirable to completely eliminate the continuous wave output between pulses. A possible means for eliminating this output is shown in the drawing as comprising a diode switch 39 in the output waveguide 11. The switch is controlled by means of a lead 40 from the output of the amplitude controlled voltage source 12 and operates to produce a short circuit at the output during the intervals between pulses. In order to protect the oscillator from the reflected energy a ferrite isolator 41 is provided in the output waveguide between the output coupling 20 and the diode switch. The isolator passes all microwave energy propagating toward the output but absorbs all energy reflected from the crystal switch between pulses.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An accurately controllable system for producing microwave pulses of various frequencies and controllable amplitudes, said system comprising a multiple electrode microwave transducer device having a frequency control electrode and an amplitude control electrode, means for applying frequency and amplitude control signals to said named electrodes, respectively, one of said control signals being gradually varied in amplitude, the other of said signals being applied intermittently in accordance with the desired interval and duration of said pulses, means for continuously applying a bias to the amplitude control electrode, means for detecting the magnitudes of the changes in amplitude in the output signal which occur gradually rather than intermittently, and means for degeneratively controlling said intermittently applied signal in accordance with said changes.

2. An accurately controllable system for producing microwave pulses of various frequencies and amplitudes, said system comprising a multiple electrode microwave oscillator having a frequency control electrode and an amplitude control electrode, means for applying frequency and amplitude control signals to said named electrodes, respectively, said frequency control signals being gradually varied in amplitude, said amplitude control signals being applied intermittently in accordance with the desired interval, duration and amplitude of said pulses, means for further applying a continuous bias to said amplitude control electrode to produce a continuous low amplitude output signal from said oscillator, means for detecting the magnitudes of the gradual changes in the amplitude of the output signal of said oscillator, and degenerative feedback means controlling the amplitude of said applied pulse signals in accordance with said detected gradual changes in amplitude of the output signal.

3. The system described in claim 2 wherein said detecting means comprises a thermistor detector.

4. The system described in claim 2 wherein said feedback control means comprises means for continually controlling the amplitude of said bias.

5. The system described in claim 2 wherein said feedback control means comprises a variable impedance element in shunt with said amplitude control electrode, said element having impedance characteristics controlled by the output of said detecting means.

6. The system described in claim 5 wherein said variable impedance element is a diode connected to said amplitude control electrode and back biased by a voltage responsive to the output of said detecting means.

7. The device as described in claim 2 further including means at the output portion of said oscillator for eliminating output energy between pulses.

8. The device described in claim 7 wherein said further means includes a microwave switch at the output of said oscillator, said switch being operably responsive to said intermittent amplitude control signals.

9. A system for producing microwave pulses having different frequencies and accurately controlled amplitudes, said system comprising a multiple electrode microwave oscillator having a frequency control electrode and an amplitude control electrode, means for applying a substantially constant amplitude signal to said amplitude control electrode to maintain a continuous low amplitude output signal from said oscillator, means for applying pulsed signals to said amplitude control electrode, said pulsed signals being proportioned to provide the desired duration and amplitude characteristics in output pulses from said oscillator, means for applying to said frequency control electrode a long duration signal which varies in amplitude at a rate considerably less than the rate of change of amplitude of said pulsed signals, thereby to vary the frequency of sequentially occurring output pulses from said oscillator, said long duration signal applied to said frequency control electrode also producing an undesired long duration amplitude variation in said output pulses, output signal detecting means for producing a detected signal whose amplitude is a function substantially only of the change in amplitude resulting from the long duration change in amplitude produced by said long duration signal applied to said frequency control electrode, said detecting means comprising a thermistor that is relatively more sensitive to said long duration amplitude changes than to said pulsed signals, and means for feeding back said detected signal to vary the amplitude of input pulses applied to said amplitude control electrode to control the amplitude of the output pulses from said oscillator.

References Cited in the file of this patent

UNITED STATES PATENTS

| | | |
|---|---|---|
| 2,163,403 | Meacham | June 20, 1939 |
| 2,637,767 | Hershberger | May 5, 1953 |
| 2,795,698 | Cutler | June 11, 1957 |
| 3,052,849 | McCurdy et al. | Sept. 4, 1962 |